Sept. 24, 1946.                H. McKEE                2,407,993
                    HOIST AND TRANSPORTING DEVICE
                    Filed June 19, 1944        2 Sheets-Sheet 1
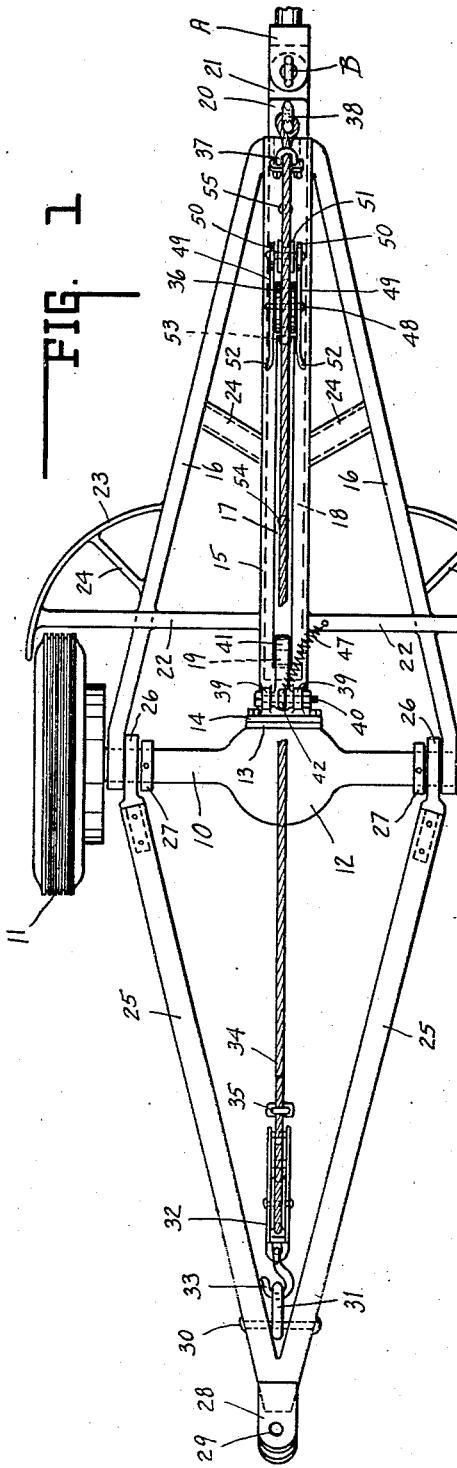
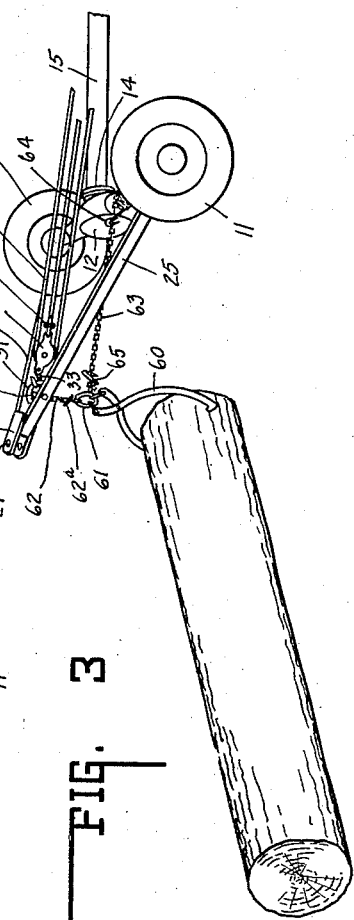
INVENTOR.
HALBERT McKEE.
BY
Lockwood, Goldsmith & Galt
ATTORNEYS.

Sept. 24, 1946.                H. McKEE                      2,407,993
                     HOIST AND TRANSPORTING DEVICE
                       Filed June 19, 1944         2 Sheets-Sheet 2
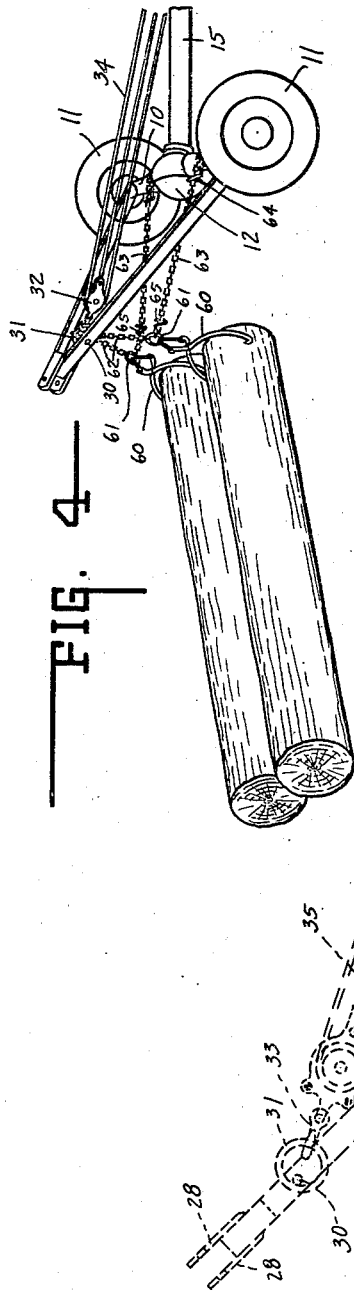
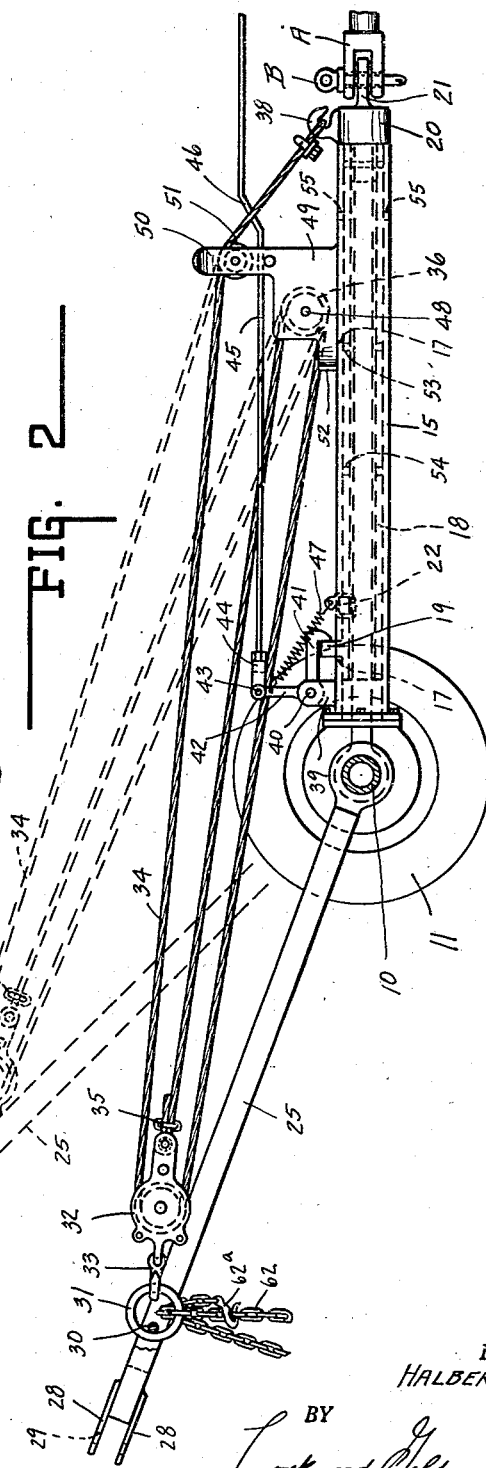
INVENTOR.
HALBERT McKEE.
BY
Lockwood, Goldsmith & Galt,
ATTORNEYS.

Patented Sept. 24, 1946

2,407,993

UNITED STATES PATENT OFFICE 2,407,993

HOIST AND TRANSPORTING DEVICE

Halbert McKee, Nineveh, Ind., assignor of two-thirds to Hill Brothers Veneer Co., Edinburg, Ind., a copartnership comprised of Harry D. Hill, Howard T. Hill, and Jack H. Hill Application June 19, 1944, Serial No. 540,915

11 Claims. (Cl. 214—65.3)

This invention relates to a device for elevating and transporting large timbers, such as logs and the like.

The chief object of this invention is to provide a device which may be drawn by a traction unit, such as an endless tread tractor and which is self-contained and is capable of multiple use as hereinafter pointed out.

In the woods a device for transporting logs for lumber and veneer purposes requires same to be of minimum length and of comparatively low clearance. Also, such a device should be capable of hauling to a loading site as many logs as possible. The present invention has simultaneously handled as many as seven logs. When completely collapsed, it is about eight feet long and six feet wide. Its load capacity is in the neighborhood of ten tons. Logs ten or more feet in length and three or more feet in diameter have been successfully transported, although individually.

A device of this character has the advantage that it can replace a dragline installation with all of its attendant costs of installation, operation, etc., and the disadvantage of shifting the location of same, etc.

The chief feature of the present invention resides in the telescopic drawbar and main tongue, and the several structural elements associated therewith.

Other objects and features of the invention will be set forth more fully hereinafter.

The full nature of the invention will be understood from the accompanying drawings and the following description and claims:

In the drawings:

Fig. 1 is a top plan view of the invention.

Fig. 2 is a longitudinal central section of same, dotted lines indicating another position of the boom.

Fig. 3 is a perspective diagrammatic view of a single log application.

Fig. 4 is a similar view of a multiple log application.

In the drawings A indicates the clevis end of a drawbar of a tractor having an endless tread, commonly known as a No. 22 Cat. This is one of the smallest available. A pin B couples this bar to the forward end of the device. The tractor drawbar is pivoted for horizontal swinging.

The device includes an axle structure supporting at opposite ends supporting wheels. Herein the axle structure 10 includes what normally would constitute a differential housing 12, but which is herein utilized because it provides the anchoring flange 13 to which is secured the companion flange 14 on the rear end of a tube 15.

The wheels 11 herein are illustrated as of single tire type. However, they may be of dual or multiple tire type when desired or required. A pair of channels 16 are directed forwardly and towards each other and are suitably secured to the forward end of tube 15. The rearward ends are suitably secured to said axle and with the same constitute a triangular base incorporating a central tube open at its forward end.

This central tube 15 is longitudinally slotted as at 17. Slidable in said tube 15 is a slightly smaller tube 18 which, near its rear end, has secured to it the block 19 that rides in said slot 17. Tube 18 at its forward end has a cap 20 that is provided with a forwardly directed loop 21 that is nestable in the clevis A and retained by the pin B. Cap 20 also includes an upwardly directed hook 38 to which further reference will be had.

Channel braces 22 project oppositely from the tube 15 to which same are suitably secured and immediately forwardly of wheels 11 and terminate adjacent same. Arcuate strap iron guards 23 are secured to the remote ends of said braces 22 and at the forward and inner ends are secured to the tube 15 forwardly of the braces. Radial-like braces 24 (of channel section) may be interposed between side channels 16 and the guards 23. Also, transverse, channel-shaped braces 24 may be secured between the side channels and the tube 15. Braces 22 herein overlie the side channels and are secured thereto.

A V-shaped boom includes two tubular sides 25, which at their remote and forward ends mount rings 26 that encircle axle 10 immediately adjacent the connection of side channels 16 thereto. Collars 27 carried by the axle maintain the spaced relation of the resulting V-shaped boom which is pivotally mounted on the axle 10.

The adjacent rearward ends of the tubes 25 are suitably secured together, and also secured thereto are the parallel plates 28 apertured at 29, this constituting a rear end clevis for trailing vehicle connection when such use is desired. It might be otherwise used.

A cross bar 30, near the vertex of the boom, passes through a ring or loop 31 interposed between the tubes. A pulley structure 32 has hook 33 connected thereto. A cable 34 has one end cable clamped as at 35 and then extends forwardly to pulley 36 rotatably supported adjacent the forward end of tube 15. The cable then returns to the pulley structure 32 and then extends forwardly and its end is loop fastened by clamp 37. This loop is hooked into the hook 36 carried by the cap 20.

When the tubes are extended, the length of the cable runs between the pulleys shortens with the result that the boom is progressively elevated. When the tubes are telescoped these runs are lengthened and the boom is lowered. The extent of pivotal movement herein found sufficient is between 20 and 75 degrees.

Adjacent the rear end of the slot 17 and at opposite sides thereof are ears 39 secured to tube 15. A pivot pin 40 pivotally supported thereby may pivotally support an angle shaped catch 41 adapted to drop in ahead of block 19 when the tubes are fully telescoped.

Extending upwardly from the catch 41 is arm 42 pivotally connected at 43 to clevis 44 connected at its forward end to control rod 45, which at its forward end is extended upwardly as at 46 toward and terminates immediately adjacent the operator's seat on the tractor for operator actuation. A spring 47 has one end secured to brace 22 and the other end to arm 42 and normally constrains catch 41 to locking position. Operator actuation of the rod opposes and overcomes the constraint.

The pulley 36 aforesaid is pivotally supported at 48 by two side plates 49. Extending upwardly therefrom is slotted glide 50 in which rod 45 is slidable. Thereabove is a pulley 51 over which passes the forward run of cable 34. This relieves wear on said cable.

Plates 49, near tube 15, to which same are secured at the forward end of slot 17, have outwardly and rearwardly directed extensions 52 forming a throat to receive and guide the block 19 on tube 18. Tube 18 may be apertured at 53 about one-third distant from its front end. A headed pin may be passed into slot 17 and seated in this aperture and bear against the forward end of slot 17 when block or lug 19 is caught by catch 41. This forms an auxiliary or safety lock. It is manually applied and removed as and when required or desired.

Another aperture 54 in said tube 18 is about two-thirds distant from the forward end of said tube and tube 15 near the forward end has an aperture 55 so that the same pin, when seated in these apertures locks the device in the extended drawbar position to be transported from one operating location to another. This locks the drawbar so that the device can be backed up with the lock in elevated position.

If desired, the boom may be first elevated by tube extension and then further tilted upwardly and forwardly and then forwardly and downwardly as far as the side channels permit. This results in a material reduction in overall length for device transportation purposes.

One method of handling logs for lumber, and more particularly veneer purposes, is to provide a pair of tongs 60 carried by ring 61. A chain 62 is passed through ring 61 and through ring 31 on the boom vertex and the hook 62a constitutes the locking connection.

A second chain 63, having a hook 64 at its forward end and a hook 65 at its rearward end, is first passed one or more times about axle 10 and anchored thereto by the hook 64. The other end of the chain is passed through the ring 61 of the tongs and secured by hook 65, see Fig. 3. This is a tension tie device and in some instances a rod may serve this same purpose.

The tongs are opened to span the log and then when the operator trips the catch, the tractor extends the tubes which first causes the tongs to bite into the log and then lifts the boom and the front end of the log to which the tongs have been applied.

Thereafter tractor movement, when lug 19 reaches the forward end of slot 17, causes forward movement of the device with the elevated log. There is no turning of the log in transit and only one end, the trailing end, becomes fouled with dirt. This is of particular importance in the veneer industry.

When more than one log is to be simultaneously transported, the requisite number of double hook chains, single hook chains and tongs are utilized and as shown in Fig. 4.

In lieu of tongs other connections may be employed, but same are required to be connected to ring 31, or its equivalent, and "tied," as it were, to the axle or frame structure, as well as suitably associated with the load.

Another use for clevis 28 is when the hauling tractor is so mired, locked, or wedged as to be immovable, a second tractor can be attached at 28 for drawing out the first tractor from its locked position.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A load elevating and transporting device including a wheeled base, a drawbar projecting forwardly thereof and slidable thereon and arranged for tractive connection, a boom pivoted on the base and always directed rearwardly from the pivotal connection to the base, the free and rearward end of the boom being adapted for load support remote from the pivotal support, and a reeving structure operatively connected between the forward portion of the base, the free end of the boom and the forward portion of the slidable drawbar for raising and lowering of the rearwardly directed boom by extension and collapse of the drawbar upon the base.

2. A device as defined by claim 1 characterized by the addition of a catch, and a catch engageable member carried by the drawbar for locking the latter in collapsed position relative to the base.

3. A device as defined by claim 1 characterized by a stop limiting the extensible movement of the drawbar on the base.

4. A device as defined by claim 1 characterized by the addition of a catch, and a catch engageable member carried by the drawbar for locking the latter in collapsed position relative to the base, means normally constraining the catch to catching position, and manually operable means for moving the catch to member releasing position in opposition to the last mentioned means.

5. In combination a wheeled base arranged for traction, a boom pivoted thereon and directed rearwardly and upwardly therefrom, means for tilting the boom upon the base, load supporting means carried by the boom free end, and tension means interposed between the base and load supporting means for load guying purposes.

6. In combination a wheeled base arranged for traction, a boom pivoted thereon and directed rearwardly and upwardly therefrom, means for tilting the boom upon the base, load supporting means carried by the boom free end, and tension means interposed between the base and load supporting means for load guying purposes, the base including a drawbar slidable longitudinally of the base, said boom tilting means comprising a reeving structure connected to the free end of the boom, the base remote from the boom pivot thereon, and the drawbar.

7. In combination a wheeled base arranged for traction, a boom pivoted thereon and directed rearwardly and upwardly therefrom, means for tilting the boom upon the base, load supporting means carried by the boom free end, and tension means interposed between the base and load supporting means for load guying purposes, the base including a drawbar slidable longitudinally of the base, said boom tilting means comprising a reeving structure connected to the free end of the boom, the base remote from the boom pivot thereon, and the drawbar, a manually releasable catch carried by the base, and a catch engageable member carried by the drawbar and engageable with and caught by the catch when the drawbar is in retracted position.

8. In combination a triangular base including a central open end tube having an elongated slot therein, a drawbar slidable in the tube and projecting from the forward end thereof, means on the drawbar and slidable in the tube slot and limiting the drawbar sliding movement, supporting wheel means at the base of triangular base, a V-shaped boom having its vertex directed rearwardly and its forward ends pivoted on said base near said wheel means, and means interposed between the drawbar, the boom vertex and the base remote from the boom pivotal connection thereto for boom movement responsive and proportional to drawbar movement relative to the base.

9. Structure as defined by claim 8 characterized by the drawbar carried means being positioned near the rear end thereof, and a manually releasable catch means for last mentioned means engagement for locking the drawbar in retracted position.

10. Structure as defined by claim 8 characterized by the drawbar carried means being positioned near the rear end thereof, and a manually releasable catch means for last mentioned means engagement for locking the drawbar in retracted position, and guide means near the forward end of the base for guiding the boom tilting means.

11. Structure as defined by claim 8 characterized by the drawbar carried means being positioned near the rear end thereof, and a manually releasable catch means for last mentioned means engagement for locking the drawbar in retracted position, and guide means near the forward end of the base for guiding a portion of the manually releasable catch means.

HALBERT McKEE.